United States Patent
Flynn et al.

(10) Patent No.: US 12,380,007 B2
(45) Date of Patent: Aug. 5, 2025

(54) OPTIMIZING DATA RESYNCHRONIZATION IN CYBER RECOVERY SOLUTIONS

(71) Applicant: Dell Products L.P., Hopkinton, MA (US)

(72) Inventors: Melissa Flynn, North Attleboro, MA (US); David Goncalves, Acushnet, MA (US); Evan Jones, Glenville, NY (US); Brett Quinn, Cotuit, MA (US)

(73) Assignee: Dell Products L.P., Hopkinton, MA (US)

( * ) Notice: Subject to any disclaimer, the term of this patent is extended or adjusted under 35 U.S.C. 154(b) by 73 days.

(21) Appl. No.: 17/994,435

(22) Filed: Nov. 28, 2022

(65) Prior Publication Data
US 2024/0176712 A1    May 30, 2024

(51) Int. Cl.
  *G06F 11/00* (2006.01)
  *G06F 11/20* (2006.01)

(52) U.S. Cl.
  CPC ...... *G06F 11/2069* (2013.01); *G06F 11/2076* (2013.01); *G06F 2201/84* (2013.01)

(58) Field of Classification Search
  CPC ............ G06F 11/2069; G06F 11/2076; G06F 2201/84; G06F 16/2365; G06F 16/273; G06F 16/275
  See application file for complete search history.

(56) References Cited

U.S. PATENT DOCUMENTS

| | | | | |
|---|---|---|---|---|
| 6,618,794 | B1* | 9/2003 | Sicola | G06F 11/1466 714/6.1 |
| 7,831,550 | B1* | 11/2010 | Pande | G06F 16/275 707/610 |
| 8,495,019 | B2* | 7/2013 | Shisheng | G06F 11/004 707/639 |
| 9,311,242 | B1* | 4/2016 | Banerjee | G06F 3/065 |
| 10,235,060 | B1* | 3/2019 | Baruch | G06F 3/0619 |
| 10,484,179 | B1* | 11/2019 | Natanzon | G06F 21/64 |
| 11,537,314 | B1* | 12/2022 | Subramanian | G06F 3/067 |
| 12,197,468 | B2* | 1/2025 | Sheelvant | G06F 16/2379 |
| 2007/0130228 | A1* | 6/2007 | Breau | G06F 11/1466 |
| 2007/0180307 | A1* | 8/2007 | Zohar | G06F 3/0607 714/E11.136 |
| 2012/0036106 | A1* | 2/2012 | Desai | G06F 16/27 707/645 |
| 2013/0006920 | A1* | 1/2013 | Kreindler | H04N 5/76 707/E17.005 |
| 2014/0164694 | A1* | 6/2014 | Storer | G06F 11/2094 711/114 |

(Continued)

*Primary Examiner* — Loan L. T. Truong
(74) *Attorney, Agent, or Firm* — Anderson Gorecki LLP (57) ABSTRACT

Recovery of a primary image is facilitated by using non-consistent snapshots on a primary storage array and consistent snapshots on a secondary storage array to avoid the need to transmit entire secondary replicas from the secondary storage array to the primary storage array. Non-consistent snaps of the primary replicas are generated by the primary storage array. Consistent snaps of the secondary replicas are generated by the secondary storage array. The primary replicas are recovered by linking non-consistent snaps to primary staging volumes, linking consistent snaps to secondary staging volumes, synchronizing the primary and secondary staging volumes, and using the synchronized primary staging volumes to recover the primary replicas.

17 Claims, 4 Drawing Sheets

(56) References Cited

U.S. PATENT DOCUMENTS

| | | | |
|---|---|---|---|
| 2015/0089171 A1* | 3/2015 | Fujita | G06F 3/061 |
| | | | 711/162 |
| 2018/0260125 A1* | 9/2018 | Botes | G06F 11/2094 |
| 2019/0012238 A1* | 1/2019 | Butterworth | G06F 11/2048 |
| 2019/0026187 A1* | 1/2019 | Gulam | G06F 16/128 |
| 2019/0079682 A1* | 3/2019 | Bikumala | G06F 11/2097 |
| 2019/0163370 A1* | 5/2019 | Sure | G06F 11/0793 |
| 2019/0325055 A1* | 10/2019 | Lee | G06F 11/1448 |
| 2019/0347029 A1* | 11/2019 | Ramachandran | G06F 3/0673 |
| 2021/0133038 A1* | 5/2021 | Ling | G06F 16/178 |
| 2021/0406132 A1* | 12/2021 | Gupta | G06F 11/1464 |
| 2022/0027051 A1* | 1/2022 | Kant | G06F 3/0617 |
| 2022/0066883 A1* | 3/2022 | Wang | H04L 69/40 |
| 2022/0100608 A1* | 3/2022 | Yu | G06F 11/1446 |
| 2022/0222152 A1* | 7/2022 | Kumar | G06F 11/1461 |
| 2022/0398163 A1* | 12/2022 | Bezbaruah | G06F 11/2097 |
| 2023/0018975 A1* | 1/2023 | Sreenivasan | G06F 16/2379 |
| 2023/0093925 A1* | 3/2023 | Liguori | G06F 9/5077 |
| | | | 718/1 |
| 2024/0241856 A1* | 7/2024 | Xie | G06F 16/164 |
| 2024/0346010 A1* | 10/2024 | Lu | G06F 16/2365 |

* cited by examiner

OPTIMIZING DATA RESYNCHRONIZATION IN CYBER RECOVERY SOLUTIONS

TECHNICAL FIELD

The subject matter of this disclosure is generally related to disaster recovery operations in a data storage system.

BACKGROUND

Institutional data storage systems such as storage area networks (SANs) and storage arrays are used to maintain storage objects that contain data used by instances of host applications running on host servers. Examples of host applications may include, but are not limited to, software for email, accounting, manufacturing, inventory control, and a wide variety of other institutional processes. Each storage object is a logical storage device that abstracts the storage space on the drives. A separate storage object or group of storage objects may be created for each host application.

It is known to configure multiple storage arrays to maintain replicas of a storage object in order to maintain availability of the host application data and avoid data loss. Production storage objects can be synchronously replicated by primary and secondary storage arrays such that the primary storage array can quickly failover to the secondary storage array. Synchronous replication is done in parallel by both storage arrays. A write IO is only acknowledged to the host-initiator after being committed to memory by both the primary and secondary storage arrays. In order to achieve synchronous replication with low IO latency, high performance components and subsystems may be required. Production storage objects can be asynchronously replicated by a disaster recovery site storage array for use in the event of corruption or loss of the replica at the primary storage array. Asynchronous replication is not done in parallel, so IO latency is less of a concern. Updates to the replica at the primary storage array are accumulated over a predetermined time interval and sent to the disaster recovery storage array in batches according to a schedule. Although asynchronous replication does not provide the same failover capability as synchronous replication, the asynchronously replicated data can be sent back to the primary storage array for recovery of the replica on the primary storage array.

SUMMARY

A method in accordance with some implementations comprises: maintaining a primary replica of a storage object on a primary storage system; generating non-consistent snapshots of the primary replica on the primary storage system; maintaining a secondary replica of the storage object on a secondary storage system; generating consistent snapshots of the secondary replica on the secondary storage system; and responsive to a disaster recovery situation, recovering the primary replica by synchronizing at least one of the non-consistent snapshots with at least one of the consistent snapshots and utilizing the synchronized non-consistent snapshot to recover the primary replica.

An apparatus in accordance with some implementations comprises: a primary storage system comprising at least one compute node configured to manage access to an array of non-volatile drives on which a primary replica of a storage object is maintained, the primary storage system configured to generate non-consistent snapshots of the primary replica; a secondary storage system comprising at least one compute node configured to manage access to an array of non-volatile drives on which a secondary replica of the storage object is maintained, the secondary storage system configured to generate consistent snapshots of the secondary replica; and the primary storage system and secondary storage system configured, responsive to a disaster recovery situation, to recover the primary replica by synchronizing at least one of the non-consistent snapshots with at least one of the consistent snapshots and utilizing the synchronized non-consistent snapshot to recover the primary replica.

In accordance with some implementations, a non-transitory computer-readable storage medium stores instructions that when executed by a storage array compute node perform a method comprising: maintaining a primary replica of a storage object on a primary storage system; generating non-consistent snapshots of the primary replica on the primary storage system; maintaining a secondary replica of the storage object on a secondary storage system; generating consistent snapshots of the secondary replica on the secondary storage system; and responsive to a disaster recovery situation, recovering the primary replica by synchronizing at least one of the non-consistent snapshots with at least one of the consistent snapshots and utilizing the synchronized non-consistent snapshot to recover the primary replica.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
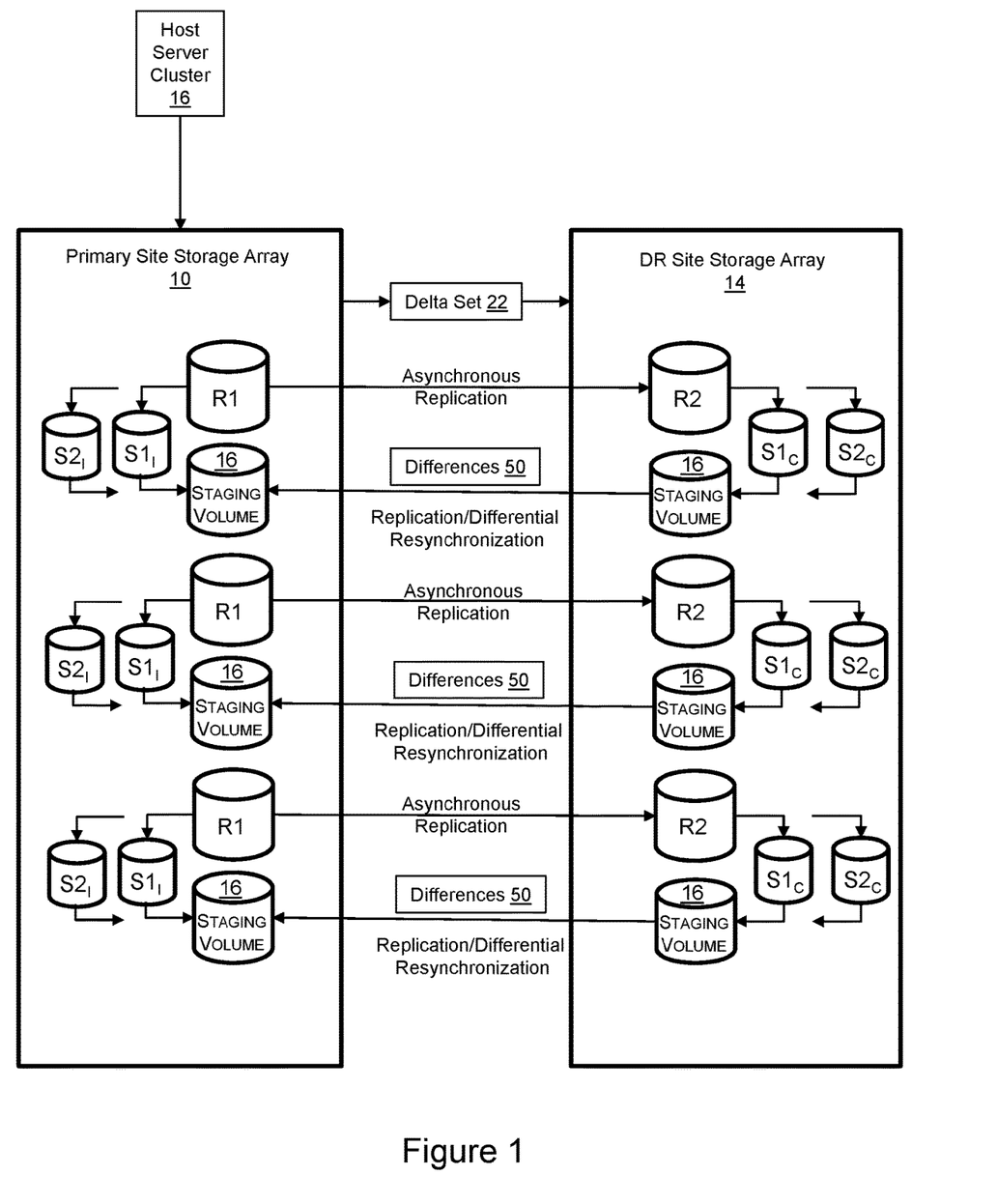
FIG. 1 illustrates a storage system in which recovery of primary images is facilitated by synchronizing inconsistent snapshots created by a primary storage array with consistent snapshots created by a disaster recovery storage array.

FIG. 1 illustrates a storage system in which recovery of a primary images is facilitated by synchronizing inconsistent snapshots created at a primary storage array with consistent snapshots created at a disaster recovery storage array. The primary storage array and disaster recovery storage array 14 are configured to asynchronously replicate production storage objects associated with replication consistency groups. A replication consistency group (RCG) is a logical container for volumes containing host application data for which updates are applied at the destination only when the destination has a consistent image in the journal. A consistency group ensures that all writes to the production volume are also written to the remote replicas in correct write-order and in a consistent way, so the replica can be used instead of the production volume. The volumes within the RCG are snapped together so that the entire image can be recovered to the same point in time. Primary replicas R1 of the production storage objects contain host application data that is accessed by instances of a host application running on a cluster 16 of host servers. Secondary replicas R2 of the storage objects are maintained on the disaster recovery site storage array 14. The secondary replicas R2 are updated asynchronously in response to updates to the primary replicas R1, which are updated in response to IOs from the host servers. Changes (deltas) to the primary replicas R1 are accumulated by the primary site storage array 10 and periodically sent to the disaster recovery site storage array 14. Each set of accumulated changes, known as a delta set 22, represents updates resulting from operations such as write IOs to the primary replicas R1 of the storage object over a period of time by the host application instances running in the host server clusters. Each individual delta may include a storage object ID, a front-end track (FE-TRK) logical block address (LBA), a timestamp, and the host application data associated with the IO. Delta sets may be generated and transmitted at fixed time intervals, e.g., every 5 seconds, 10 seconds, 30 seconds, or some other time period. Unlike snapshots, delta sets do not require an external action or request to initiate the creation of a snap volume, cessation of IOs to the storage object, or comparison of two storage objects to identify differences. Consequently, delta sets are created and transmitted via normal storage array processing and can be created more frequently than snapshots without overloading the storage array and disrupting host applications. Unlike continuous data protection, delta sets do not necessarily include all changes that occur during the time interval. For example, if a block is updated three times during a 15 second delta set generation interval, then only the last update is included in the delta set.

The disaster recovery storage array 14 uses the delta sets received from the primary storage array to maintain the secondary replicas R2. At some point in time prior to applying a delta set 22 to update the secondary replicas R2, the disaster recovery site storage array 14 generates "crash-consistent" snapshots $S1_C$ of the secondary replicas R2. The snapshots $S1_C$ are considered to be crash-consistent because all delta set updates prior to generation of the snapshots $S1_C$ have been persisted to non-volatile storage. After receiving delta set 22, the disaster recovery site storage array 14 applies the delta set changes to the secondary replicas R2. A new set of crash-consistent snapshots $S2_C$ of the secondary replicas R2 is generated after the changes have been applied to the secondary replicas R2. Each snapshot represents the entire replicated storage object but may contain only the changes since the previous snapshot.

The primary site storage array generates non-consistent (inconsistent) snapshots $S1_I$, $S2_I$ of the primary replicas R1. The procedure for generation of a consistent snapshot of a production storage object at a production site generally includes temporarily halting IOs to the storage object while the consistent snapshot is generated. A drawback of generation of consistent snapshots at a production site is that it is somewhat disruptive to normal operation of the host applications. A non-consistent snapshot is generated based on data that has been destaged to persistent storage. Other data, including data associated with in-flight IOs from hosts and dirty data buffered in the cache hierarchy, is not included in the non-consistent snapshot. An advantage of non-consistent snapshots is that generation is not as disruptive as generation of a consistent snapshot because IOs from the hosts to the storage object are not halted. The non-consistent snapshots $S1_I$, $S2_I$ of the primary replicas R1 and the consistent snapshots $S1_C$, $S2_C$ of the secondary replicas R2 may be generated according to the same schedule.

It is known to perform disaster recovery at a production site storage array by retrieving data from a disaster recovery site storage array. For example, a snapset of snapshots representative of the state of a replicated production storage object at the point in time to which the replicated storage object will be recovered can be sent from the disaster recovery site storage array to the primary site storage array over a network. A drawback of this disaster recovery procedure is that a significant amount of data may need to be transmitted from the disaster recovery site storage array to the primary site storage array, resulting in undesirable delay between disaster and recovery.

The presently disclosed storage system reduces the amount of data required to be sent between the storage arrays by reconciling a snapset of non-consistent snapshots of the primary replica being recovered with a snapset of consistent snapshots of the secondary replica. The consistent snapset corresponding to the recovery point, e.g., consistent snapshots $S1_C$, are linked to staging volumes 16 on the disaster recovery site storage array. The non-consistent snapset corresponding to the recovery point, e.g., non-consistent snapshots $S1_I$, are linked to staging volumes on the primary site storage array. The staging volumes are configured for remote replication and differential synchronization is performed to resolve inconsistencies between pairs of the staging volumes. More specifically, any data differences 50 between the staging volumes are resolved in favor of the consistent snapset and sent to the primary site storage array by the secondary site storage array. Differences can be identified by comparing cyclic redundancy check (CRC) information. In general, a relatively small percentage of the data will differ, e.g., only the changes that were in-flight or otherwise not captured due to the nature of how generation of consistent and non-consistent snapshots differs. Most of the data needed to recover the primary image will already be present at the primary site in the non-consistent snapshots. Consequently, the amount of data required to be sent from the disaster recovery storage array to the primary storage array to recover the primary replicas R1 will be smaller than the entire dataset and disaster recovery can be completed in less time than with the previous procedure.

Figure 2:
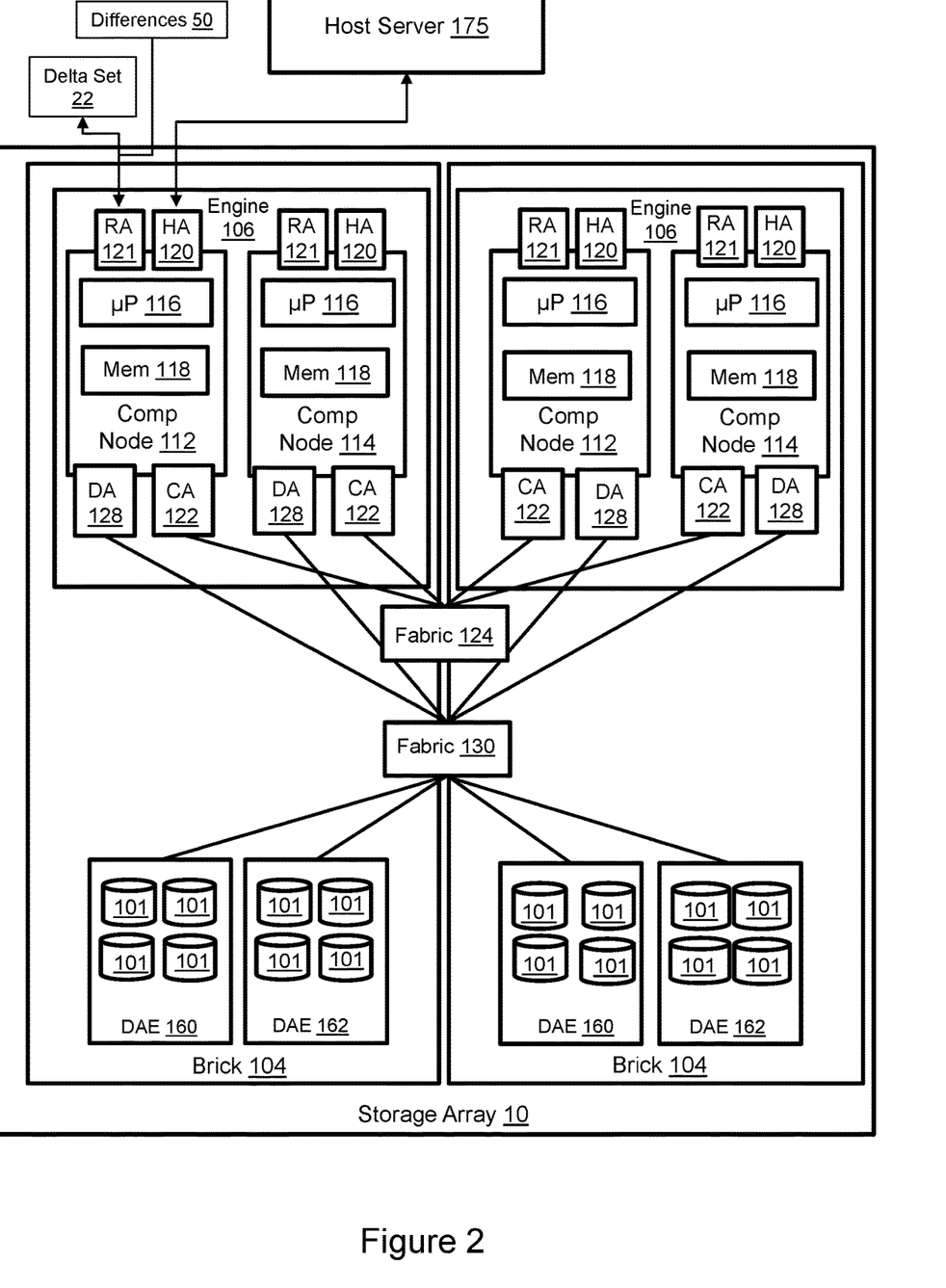
FIG. 2 illustrates the primary storage array in greater detail.

FIG. 2 illustrates the primary storage array 10 in greater detail. The storage array includes one or more bricks 104. Each brick 104 includes an engine 106 and one or more disk array enclosures (DAEs) 160, 162. In the illustrated example there are only two engines, but the storage array could include a greater number of engines. Each engine 106 includes two interconnected compute nodes 112, 114 that are arranged as a mirrored pair for failover and may be referred to as "storage directors." Although it is known in the art to refer to the compute nodes of a SAN as "hosts," that naming convention is avoided in this disclosure to help distinguish the network server hosts from the compute nodes 112, 114. Each compute node is implemented as a separate PCB or blade and includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory to a shared memory that can be accessed by all compute nodes of the storage array using direct memory access (DMA). Each compute node includes one or more host adapters (HAs) 120 for communicating with host servers such as host server 175. Each host adapter has resources for servicing input-output commands (IOs) from host servers. The host adapter resources may include processors, volatile memory, and ports via which the hosts may access the storage array. Each compute node also includes a remote adapter (RA) 121 for communicating with other storage systems, e.g., the other storage arrays for exchanging delta sets 22 for replication and differences 50 for synchronizing staging volumes. Each compute node also includes one or more disk adapters (DAs) 128 for communicating with managed drives 101 in the DAEs 160, 162. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media that may be of any type, e.g., solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A backend connection group includes all disk adapters that can access the same drive or drives. In some implementations every disk adapter 128 in the storage array can reach every DAE via the fabric 130. Further, in some implementations every disk adapter in the storage array can access every managed disk 101.

Figure 3:
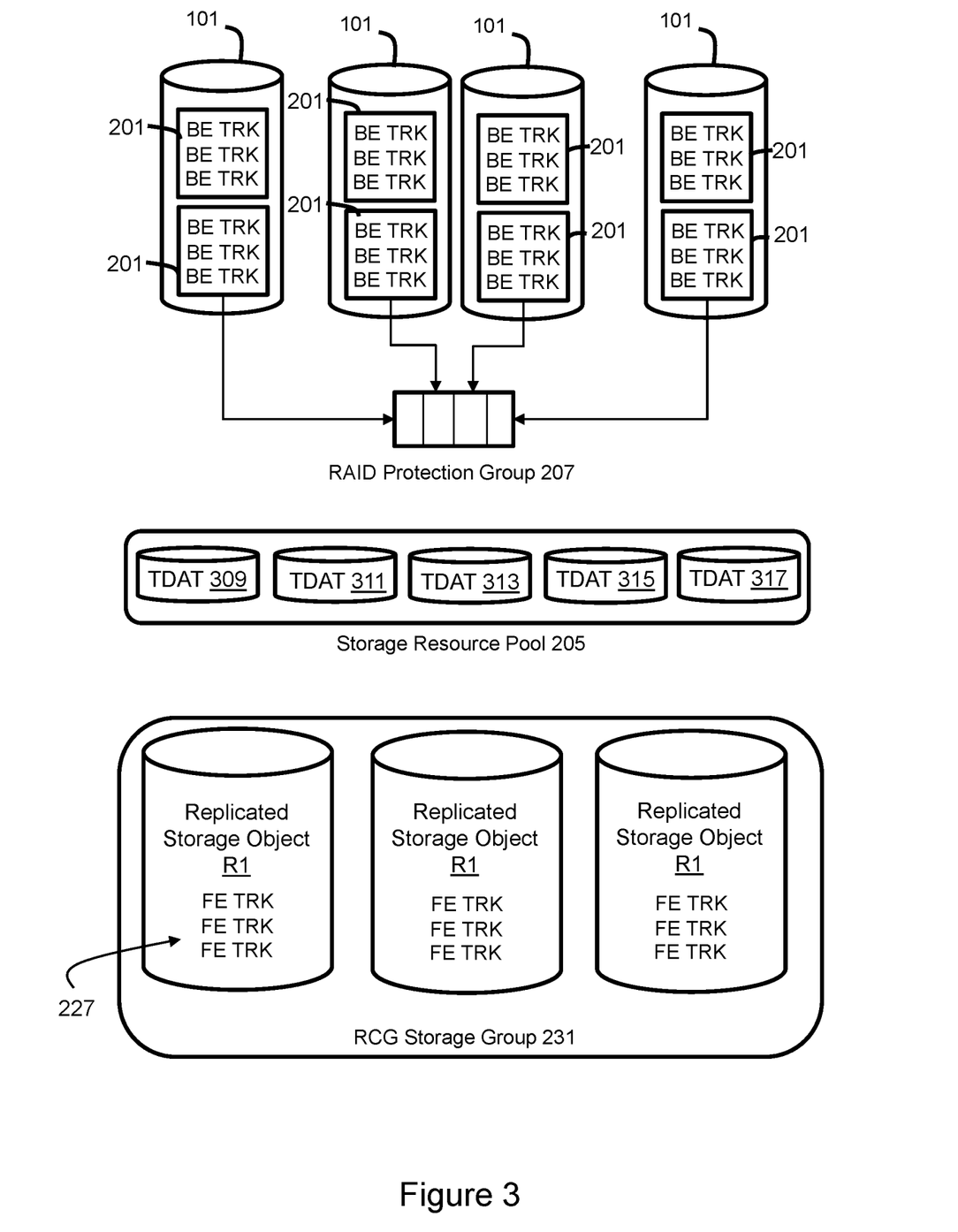
FIG. 3 illustrates layers of abstraction between the managed drives and storage objects of a storage array.

Referring to FIGS. 2 and 3, the host application data that is logically stored on the primary replicas R1 is persistently stored on the managed drives 101. Without limitation, storage objects such as the primary replicas R1 may be referred to as volumes, devices, or LUNs, where a logical unit number (LUN) is a number used to identify logical storage volumes in accordance with the small computer system interface (SCSI) protocol. From the perspective of the host servers, each production storage object is a single disk having a set of contiguous logical block addresses (LBAs) on which data used by the instances of a host application resides. However, the host application data is stored at non-contiguous addresses on various managed drives 101. A RCG storage group 231 of the primary replicas R1 may be created for an individual host application. Multiple instances of a single host application may use data from the same storage group, but instances of different host applications do not use data from the same storage group. The storage array may maintain a large number of production storage objects and storage groups.

The compute nodes 112, 114 maintain metadata that maps between the LBAs of the production storage objects (primary replicas R1) and physical addresses on the managed drives 101. The basic allocation unit of storage capacity that is used by the compute nodes 112, 114 to access the managed drives 101 is a back-end track (BE TRK). The managed drives may be configured with partitions or splits 201, each of which may contain multiple BE TRKs. A group of partitions or splits from different managed drives is used to create a RAID protection group 207. A storage resource pool 205 is a storage object that includes a collection of RAID protection groups 207 of the same type, e.g., RAID-5 (3+1). Storage resource pools are used to create the production storage objects (replica R1, 221, 223). The host application data is logically stored in front-end tracks (FE TRKs) on the production storage objects. The FE TRKs are mapped to the BE TRKs and vice versa by FE TRK IDs and BE TRK IDs, which are pointers that are maintained in the shared memory.

Figure 4:
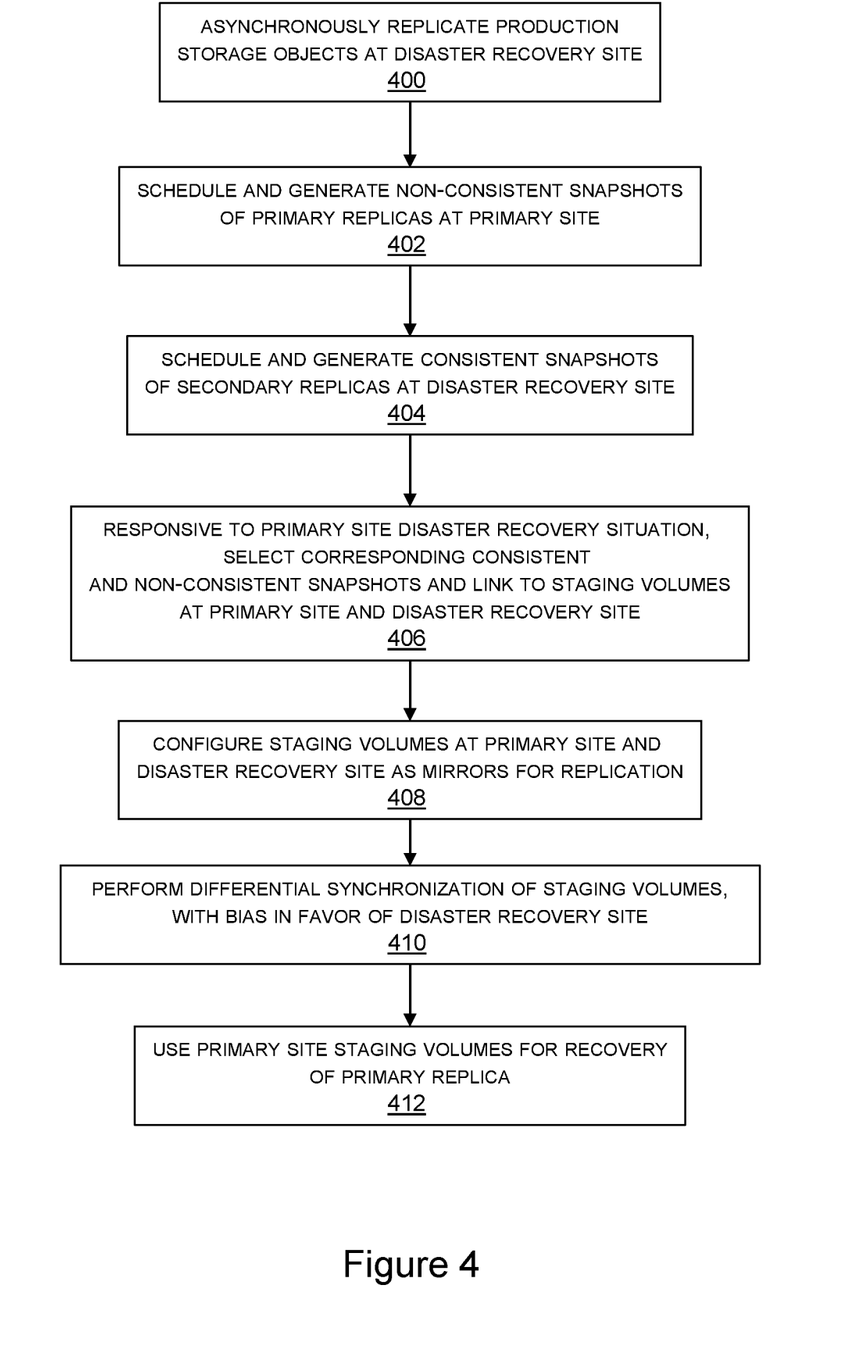
FIG. 4 illustrates a disaster recovery method.

FIG. 4 illustrates a disaster recovery method. Step 400 is asynchronously replicating production storage objects. Primary replicas of the production storage objects are maintained by a primary storage array and secondary replicas of the storage objects are maintained on a secondary storage array at a disaster recovery site. The primary replicas and secondary (disaster recovery) replicas may be referred to as R1 and R2, respectively. Step 402 is scheduling and generating non-consistent snapshots of the primary replicas R1 at the primary storage array. The snapshots may be generated periodically in accordance with a predetermined schedule. Step 404 is scheduling and generating consistent snapshots of the secondary replicas R2 at the secondary storage array. The snapshots may be generated periodically in accordance with the predetermined schedule. In response to a disaster recovery situation at the primary site, consistent and non-consistent snapshots corresponding to a recovery point are selected and linked to respective staging volumes at the primary storage array and the secondary storage array as indicated in step 406. The disaster recovery situation may include corruption or loss of a primary replica R1. In step 408 the staging volumes at the primary site and the disaster recovery site are configured for remote replication. Step 410 is performing differential synchronization of the staging volumes with a bias in favor of the staging volume on the secondary storage array. In other words, inconsistencies are identified and resolved in favor of the consistent snapshot data. When the staging volumes are synchronized such that the primary site staging volumes are to the corresponding secondary site staging volumes, the primary site staging volumes are used for recovery of the primary replicas R1 as indicated in step 412.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
maintaining an asynchronously replicated primary replica of a storage object on a primary storage system by accumulating updates to the storage object and periodically transmitting the updates in delta sets;
generating non-consistent snapshots of the asynchronously replicated primary replica on the primary storage system for which only data that has been destaged to persistent storage is included in the non-consistent snapshots and data associated with in-flight IOs from hosts and dirty data buffered in cache are not included in the non-consistent snapshots, and for which some delta set updates prior to generation of the non-consistent snapshots have not been persisted to non- volatile storage;
maintaining a secondary asynchronous replica of the storage object on a secondary storage system by asynchronously replicating the primary replica to the secondary replica using the updates in the delta sets;
generating consistent snapshots of the secondary asynchronous replica on the secondary storage system by temporarily halting IOs and causing all delta set updates prior to generation of the consistent snapshots to be persisted to non-volatile storage and included in the consistent snapshots; and
responsive to a disaster recovery situation, recovering the primary replica by using staging volumes on the primary storage system and the secondary storage system for synchronizing at least one of the non-consistent snapshots of the asynchronously replicated primary replica with at least one of the consistent snapshots of the secondary asynchronous replica by identifying data differences between the staging volumes and sending the data differences from the secondary storage system to the primary storage system to create a synchronized non-consistent snapshot on the primary storage system and utilizing the synchronized non-consistent snapshot to recover the primary replica, thereby achieving recovery of the asynchronously replicated primary replica without transmitting all data of the at least one of the consistent snapshots from the secondary storage system to the primary storage system.

2. The method of claim 1 further comprising generating the non-consistent snapshots of the primary replica on the primary storage system and generating the consistent snapshots of the secondary replica on the secondary storage system according to a common schedule.

3. The method of claim 1 further comprising selecting a primary snapset of the non- consistent snapshots of the primary replica on the primary storage system and linking the primary snapset to a primary staging volume on the primary storage system.

4. The method of claim 3 further comprising selecting a secondary snapset of the consistent snapshots of the secondary replica on the secondary storage system and linking the secondary snapset to a secondary staging volume on the secondary storage system.

5. The method of claim 4 further comprising configuring the primary staging volume and the secondary staging volume for differential remote replication.

6. The method of claim 5 further comprising synchronizing the primary staging volume with the secondary staging volume with a bias in favor of the secondary staging volume.

7. An apparatus comprising:
a primary storage system comprising at least one compute node configured to manage access to an array of non-volatile drives on which an asynchronously replicated primary replica of a storage object is maintained by accumulating updates to the storage object and periodically transmitting the updates in delta sets, the primary storage system configured to generate non-consistent snapshots of the asynchronously replicated primary replica for which only data that has been destaged to persistent storage is included in the non-consistent snapshots and data associated with in-flight IOs from hosts and dirty data buffered in cache are not included in the non-consistent snapshots, and for which some delta set updates prior to generation of the non-consistent snapshots have not been persisted to non-volatile storage;
a secondary storage system comprising at least one compute node configured to manage access to an array of non-volatile drives on which a secondary asynchronous replica of the storage object is maintained by asynchronously replicating the primary replica to the secondary replica using the updates in the delta sets, the secondary storage system configured to generate consistent snapshots of the secondary asynchronous replica by temporarily halting IOs and causing all delta set updates prior to generation of the consistent snapshots to be persisted to non-volatile storage and included in the consistent snapshots; and
the primary storage system and secondary storage system configured, responsive to a disaster recovery situation, to recover the primary replica by using staging volumes on the primary storage system and the secondary storage system for synchronizing at least one of the non-consistent snapshots of the asynchronously replicated primary replica with at least one of the consistent snapshots of the secondary asynchronous replica by identifying data differences between the staging volumes and sending the data differences from the secondary storage system to the primary storage system to create a synchronized non-consistent snapshot on the primary storage system and utilizing the synchronized non-consistent snapshot on the primary storage system to recover the primary replica, thereby achieving recovery of the asynchronously replicated primary replica without transmitting all data of the at least one of the consistent snapshots from the secondary storage system to the primary storage system.

8. The apparatus of claim 7 further comprising the primary storage system configured to generate the non-consistent snapshots of the primary replica and the secondary storage system configured to generate the consistent snapshots of the secondary replica on the secondary storage system according to a common schedule.

9. The apparatus of claim 7 further comprising the primary storage system configured to select a primary snapset of the non-consistent snapshots of the primary replica and link the primary snapset to a primary staging volume.

10. The apparatus of claim 9 further comprising the secondary storage system configured to select a secondary snapset of the consistent snapshots of the secondary replica and link the secondary snapset to a secondary staging volume.

11. The apparatus of claim 10 further comprising the primary storage system and the secondary storage system adapted to configure the primary staging volume and the secondary staging volume for differential remote replication.

12. The apparatus of claim 11 further comprising the primary storage system and the secondary storage system adapted to synchronize the primary staging volume with the secondary staging volume with a bias in favor of the secondary staging volume.

13. A non-transitory computer-readable storage medium storing instructions that when executed by compute nodes in a storage system perform a method comprising:
    maintaining an asynchronously replicated primary replica of a storage object on a primary storage system by accumulating updates to the storage object and periodically transmitting the updates in delta sets;
    generating non-consistent snapshots of the asynchronously replicated primary replica on the primary storage system for which only data that has been destaged to persistent storage is included in the non-consistent snapshots and data associated with in-flight IOs from hosts and dirty data buffered in cache are not included in the non-consistent snapshots, and for which some delta set updates prior to generation of the non-consistent snapshots have not been persisted to non-volatile storage;
    maintaining a secondary asynchronous replica of the storage object on a secondary storage system by asynchronously replicating the primary replica to the secondary replica using the updates in the delta sets;
    generating consistent snapshots of the secondary asynchronous replica on the secondary storage system by temporarily halting IOs and causing all delta set updates prior to generation of the consistent snapshots to be persisted to non-volatile storage and included in the consistent snapshots; and
    responsive to a disaster recovery situation, recovering the primary replica by using staging volumes on the primary storage system and the secondary storage system for synchronizing at least one of the non-consistent snapshots of the asynchronously replicated primary replica with at least one of the consistent snapshots of the secondary asynchronous replica by identifying data differences between the staging volumes and sending the data differences from the secondary storage system to the primary storage system to create a synchronized non-consistent snapshot on the primary storage system and utilizing the synchronized non-consistent snapshot on the primary storage system to recover the primary replica, thereby achieving recovery of the asynchronously replicated primary replica without transmitting all data of the at least one of the consistent snapshots from the secondary storage system to the primary storage system.

14. The non-transitory computer-readable storage medium of claim 13 in which the method further comprises generating the non-consistent snapshots of the primary replica on the primary storage system and generating the consistent snapshots of the secondary replica on the secondary storage system according to a common schedule.

15. The non-transitory computer-readable storage medium of claim 13 in which the method further comprises selecting a primary snapset of the non-consistent snapshots of the primary replica on the primary storage system and linking the primary snapset to a primary staging volume on the primary storage system.

16. The non-transitory computer-readable storage medium of claim 15 in which the method further comprises selecting a secondary snapset of the consistent snapshots of the secondary replica on the secondary storage system and linking the secondary snapset to a secondary staging volume on the secondary storage system.

17. The non-transitory computer-readable storage medium of claim 16 in which the method further comprises configuring the primary staging volume and the secondary staging volume for differential remote replication and synchronizing the primary staging volume with the secondary staging volume with a bias in favor of the secondary staging volume.

* * * * *